(12) United States Patent
Calvin

(10) Patent No.: US 11,691,757 B2
(45) Date of Patent: Jul. 4, 2023

(54) AIRCRAFT EXTERIOR LIGHTING MULTI-EMITTER ARRAY FOR VARIABLE BEAM PROFILE

(71) Applicant: Nathan Howard Calvin, Boise, ID (US)

(72) Inventor: Nathan Howard Calvin, Boise, ID (US)

( * ) Notice: Subject to any disclaimer, the term of this patent is extended or adjusted under 35 U.S.C. 154(b) by 0 days.

(21) Appl. No.: 17/409,190

(22) Filed: Aug. 23, 2021

(65) Prior Publication Data

US 2023/0060027 A1  Feb. 23, 2023

(51) Int. Cl.
| | |
|---|---|
| *F21V 5/04* | (2006.01) |
| *B64D 47/04* | (2006.01) |
| *F21V 23/04* | (2006.01) |
| *F21Y 115/10* | (2016.01) |
| *F21W 107/30* | (2018.01) |

(52) U.S. Cl.
CPC .......... *B64D 47/04* (2013.01); *F21V 5/04* (2013.01); *F21V 23/04* (2013.01); *B64D 2203/00* (2013.01); *F21W 2107/30* (2018.01); *F21Y 2115/10* (2016.08)

(58) Field of Classification Search
CPC ....... B64D 47/04; B64D 2203/00; F21V 5/04; F21W 2107/30
See application file for complete search history.

(56) References Cited

U.S. PATENT DOCUMENTS

| | | | |
|---|---|---|---|
| 1,772,889 A | 8/1930 | Fairchild | |
| 5,355,131 A | 10/1994 | Metz et al. | |
| 5,519,590 A | 5/1996 | Crookham et al. | |
| 5,984,494 A | 11/1999 | Chapman et al. | |
| 6,168,294 B1 | 1/2001 | Erni et al. | |
| 6,439,752 B1 | 8/2002 | Petrick | |
| 6,669,357 B2 | 12/2003 | Konicke et al. | |
| 6,744,210 B2 | 6/2004 | Petrick | |
| 6,962,423 B2 | 11/2005 | Hamilton et al. | |
| 7,645,053 B2 | 1/2010 | Machi et al. | |
| 8,517,579 B2 | 8/2013 | Curtis | |
| 8,662,721 B2 | 3/2014 | Calvin et al. | |
| 8,851,718 B2 | 10/2014 | Jha et al. | |
| 9,115,876 B1 * | 8/2015 | Mart | F21V 29/67 |
| 9,723,677 B2 | 8/2017 | Hessling-Von Heimendahl et al. | |

(Continued)

FOREIGN PATENT DOCUMENTS

| | | | |
|---|---|---|---|
| CN | 210984098 U * | 7/2020 | |
| EP | 1932761 A2 | 6/2008 | |

(Continued)

OTHER PUBLICATIONS

English translation of Zhang CN-210984098-U, published Jul. 2020 (Year: 2020).*

*Primary Examiner* — Evan P Dzierzynski

(74) *Attorney, Agent, or Firm* — Williams Intellectual Property; Benjamin F. Williams

(57) ABSTRACT

An aircraft exterior lighting multi-LED array for variable beam profile enables illumination of landing and taxi lights from a common fixture. An optic enables direction of luminance emitted from at least one central emitter (or cluster of emitters) along steradians illuminated when landing while directing luminance emitted from at least one peripheral emitter (or cluster of emitters) along steradians illuminated when taxiing.

10 Claims, 3 Drawing Sheets

(56) References Cited

U.S. PATENT DOCUMENTS

| | | |
|---|---|---|
| 9,772,088 B1 | 9/2017 | Lopresti |
| 10,094,969 B2 | 10/2018 | York et al. |
| 2003/0058641 A1* | 3/2003 | Watanabe ................ F21V 5/04 |
| | | 362/800 |
| 2011/0188257 A1 | 8/2011 | Sidler |
| 2012/0140498 A1 | 6/2012 | Fabbri et al. |
| 2012/0268959 A1 | 10/2012 | Barnett et al. |
| 2012/0313547 A1 | 12/2012 | Barnett et al. |
| 2013/0077332 A1 | 3/2013 | Hessling et al. |
| 2014/0232288 A1* | 8/2014 | Brandes ................ F21K 9/232 |
| | | 315/250 |
| 2016/0345408 A1 | 11/2016 | Schoen et al. |
| 2017/0021940 A1 | 1/2017 | Nogales et al. |
| 2018/0141677 A1* | 5/2018 | Lapujade ............... B64D 45/08 |
| 2018/0172242 A1* | 6/2018 | Stopa ..................... F21V 13/04 |

FOREIGN PATENT DOCUMENTS

| | | | |
|---|---|---|---|
| EP | 2392511 B1 | 12/2011 | |
| WO | WO-2018118955 A1 * | 6/2018 | ............... F21K 9/00 |

\* cited by examiner

AIRCRAFT EXTERIOR LIGHTING MULTI-EMITTER ARRAY FOR VARIABLE BEAM PROFILE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Aircraft exterior lights are subject to industry standards and regulation to ensure requisite visibility of the aircraft across a range of positions, in flight and on the ground. Title 14 of the Code of Federal Regulations, Aeronautics and Space, ("14 C.F.R.") comprises the body of rules and regulations that implements the Federally adopted requirements. For example, each taxi and landing light on an aircraft must be approved and installed so that no objectional glare is visible to the pilot; the pilot is not adversely affected by halation; and the light provides sufficient illumination for night landing. 14 C.F.R. § 25.1383 (a). Except where one switch is used for the lights of a multiple light installation at one location (herein, "fixture"), there must be a separate switch for each light. Id., § 25.1383 (b).

Typically, as seen in the present state of the art, aircrafts employ separate lighting circuits to control illumination directed for particular purposes. For example, landing lights, which are collimated forwards in a focused beam to avoid halation and glare affecting the pilot, typically are separate fixtures independently operable relative to taxi lights, which are beamed to direct light laterally and illuminate an intended direction of travel while also increasing visibility of the aircraft for on-ground travel.

However, with the advent of Light Emitting Diodes ("LEDs") in the industry, significant luminance may be produced at relatively low energies. LEDs now commonly replace larger, incandescent bulbs, metal halides, high pressure sodium lamps, and other emitters, to extend viable life of aircraft exterior lighting fixtures and lower electrical demand. Additionally, the relatively small size and versatility of LEDs allows for the creation of illuminable arrays within fixtures, in various clusters, to produce a range of luminance and beam positions from the same fixture.

The present invention, then, contemplates situating a landing light as at least one central emitter (or cluster of emitters) in a common fixture with at least one peripheral emitter (or cluster of emitters) for illumination when taxiing. The at least one peripheral emitter (or cluster of emitters) is independently operable in lieu of, and in addition to, the central emitter(s) to enable a variable beam profile operable in the same light fixture to illuminate a range of steradians. Thus one light may serve as a landing light and a taxi light, functional upon the same circuit.

FIELD OF THE INVENTION

The present invention relates to aircraft exterior lights, and particularly, to an aircraft exterior lighting multi-emitter array for variable beam profile that enables independent illumination of emitters to correspond with landing light and taxi light illuminance emitted from the same light fixture.

SUMMARY OF THE INVENTION

The present aircraft exterior lighting multi-emitter array has been devised to enable variable beam illumination of a single lighting fixture for landing and, in the alternative, for taxiing.

A single lighting fixture is operable within a common circuit and enables illumination of at least a one central emitter (or cluster of emitters) and alternatively, in addition to or in lieu of the at least one central emitter, illumination of at least one peripheral emitter (or cluster of emitters). A variable beam is therefore producible between a focused, central beam, suited for landing, and a lateral beam directed within a coronal plane relative to the aircraft, suitable for taxiing.

It should be noted herein throughout that the term "emitter" is not intended to be limited to LEDs only but may apply to any emitter usable to create visible light in the manner herein disclosed. While LEDs are represented in the current the state of the art, it should be recognized that the principal inventive step herein is directed to the arrangement of emitters interior to a single light fixture, and their connection in parallel within a single circuit, and is therefore applicable to any emitter capable of producing sufficient luminous intensity at an equivalent and desired rate of power.

The instant invention, therefore, requires at least one central emitter connected in parallel with at least one peripheral emitter. The at least one central emitter is devised to illuminate a beam collimated and/or refracted and/or reflected into a central beam that is directed forward relative to the aircraft. The at least one peripheral emitter is devised to illuminate a beam collimated and/or refracted and/or reflected into a lateral beam directed laterally within a coronal plane relative to the aircraft. Each of the at least one central emitter and peripheral emitter is connected in parallel and independently operable to illuminate separately by action of separate switches run on the same circuit.

In one embodiment contemplated herein, the at least one peripheral emitter includes at least two peripheral emitters disposed diametrically apart on either side of the at least one central emitter. A collimator, lens, or other refractive and/or reflective cover (herein throughout, "optic") directs the light emitted from each of the at least two peripheral emitters into a lateral beam, disposed to direct light laterally relative the beam produced by the at least one central emitter, within a coronal plane relative to the aircraft. The optic likewise directs a beam of light emitted from the at least one central emitter, forwardly projected relative to the aircraft.

The optic, therefore, includes at least two collimators and/or reflective surfaces and/or refractive lenses wherein light emitted by the emitters within the fixture is directable into various beams for landing and/or taxiing. The entire fixture is operable by one circuit, in which the at least one central emitter is connected in parallel with each of the at least one peripheral emitters. Separate switches are operable to independently illuminate each of the emitters running on a single circuit installed to the aircraft lighting system.

Additional embodiments are contemplated as within scope of this disclosure wherein the at least one peripheral emitter includes a plurality of emitters either clustered in groups peripherally about the central emitter (to direct beams forward, aft, port, and starboard) or disposed populating a circumference in whole or in part around the central emitter. The plurality of peripheral emitters may be connected in parallel on a branch circuit, thereby operable by a common switch (wherein they all illuminate at the same time) or on multiple branch circuits (wherein a pilot may illuminate some or all of the peripheral emitters in response to weather and/or emergency situations, for example).

The aircraft exterior lighting multi-LED array, therefore, allows for a single aircraft lighting fixture to perform multiple functions for which more than one light fixture is typically required in the current state of the art. The long life of LEDs and other emitters seen and emerging in the art presents a useful improvement over existing landing and taxiing lights which are often duplicate in the state of the art.

Thus has been broadly outlined the more important features of the present aircraft exterior lighting multi-LED array so that the detailed description thereof that follows may be better understood and in order that the present contribution to the art may be better appreciated.

Objects of the present aircraft exterior lighting multi-LED array, along with various novel features that characterize the invention are particularly pointed out in the claims forming a part of this disclosure. For better understanding of the aircraft exterior lighting multi-LED array, its operating advantages and specific objects attained by its uses, refer to the accompanying drawings and description.

BRIEF DESCRIPTION OF THE DRAWINGS

FIGS.

Figure 1:
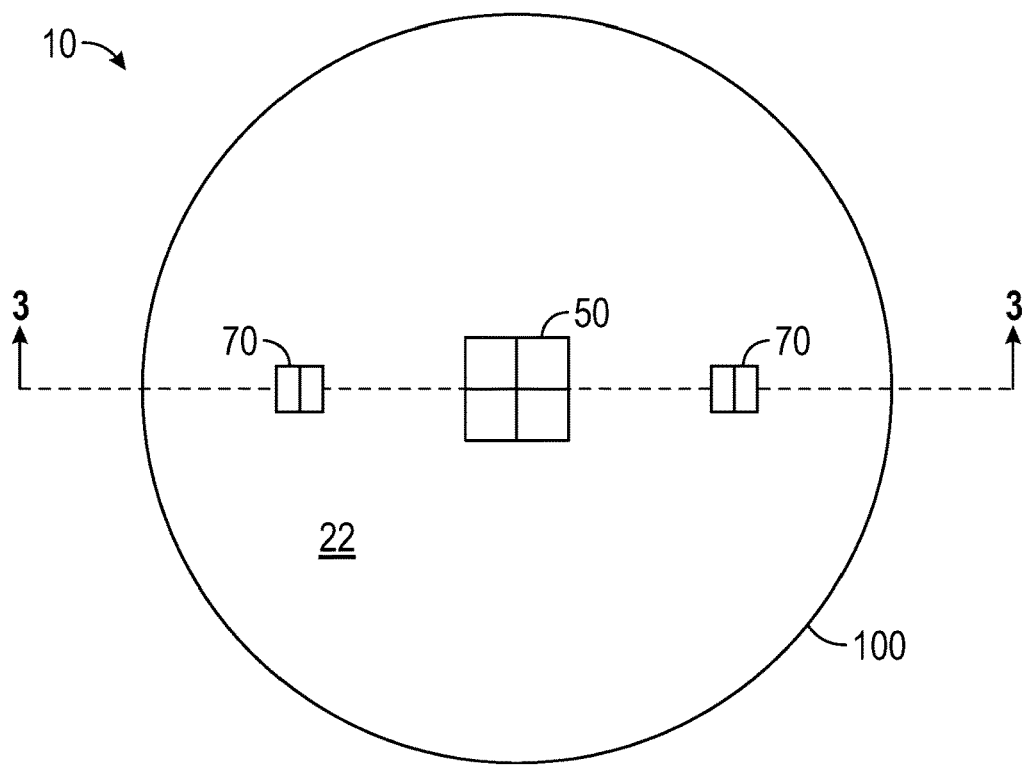

FIG. 1 is a top elevation view of an example embodiment of an aircraft exterior multi-emitter array for variable beam profile fixture with an optic removed to illustrate at least one central emitter and at least one peripheral emitter situated thereabouts.

Figure 2:
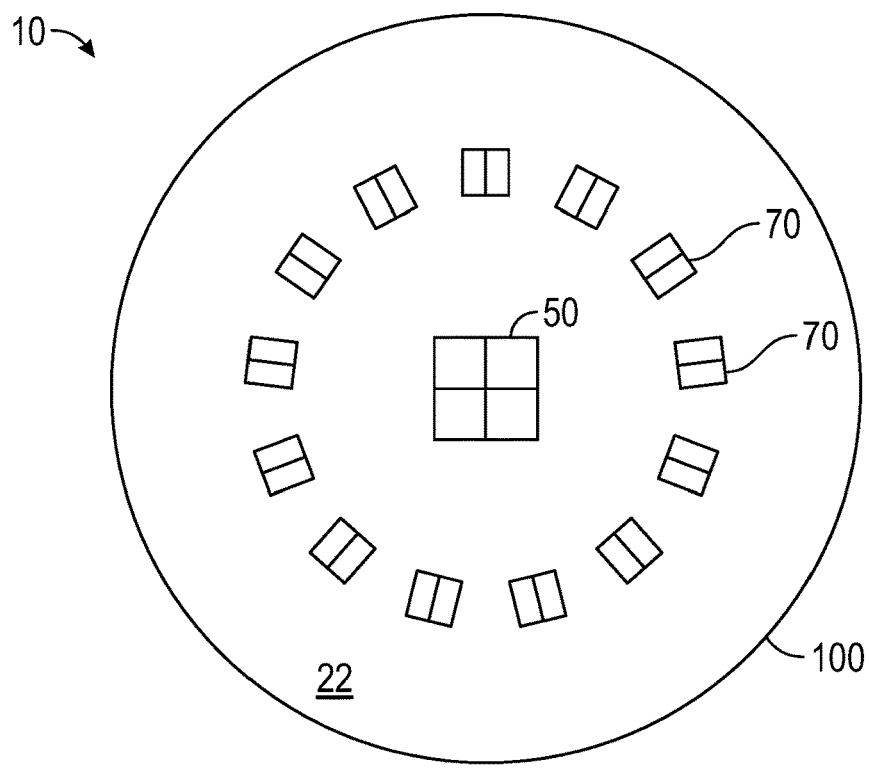

FIG. 2 is a top elevation view of an example embodiment of the aircraft exterior multi-emitter array for variable beam profile fixture with the optic removed to illustrate at least one central emitter surrounded by a plurality of peripheral emitters.

Figure 3:
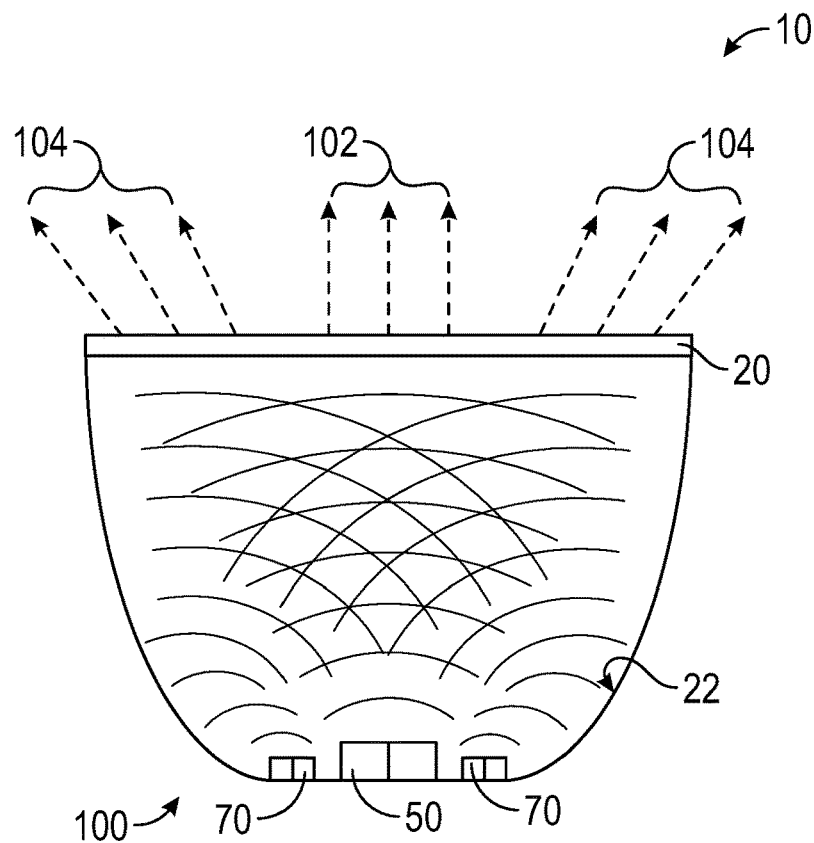

FIG. 3 is a transverse section view, taken along a line 3-3 of FIG. 1 bisecting the fixture to show, diagrammatically, the light path produced by each of the emitters through the optic.

Figure 4:
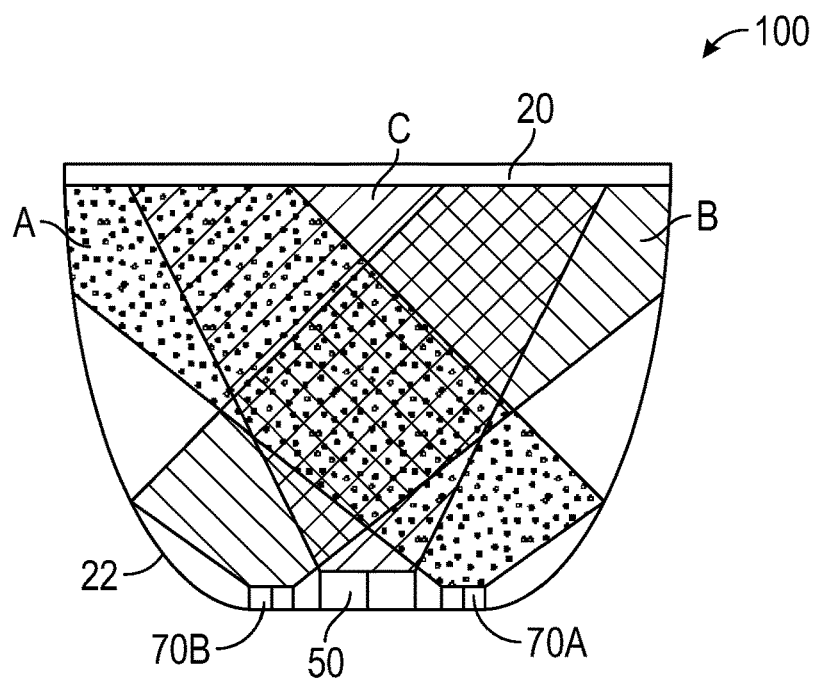

FIG. 4 is transverse section view, taken along the line 3-3 of FIG. 1 illustrating idealized and simplified collimators that direct illuminance within a condenser wherein each of the emitters is disposed.

Figure 5:
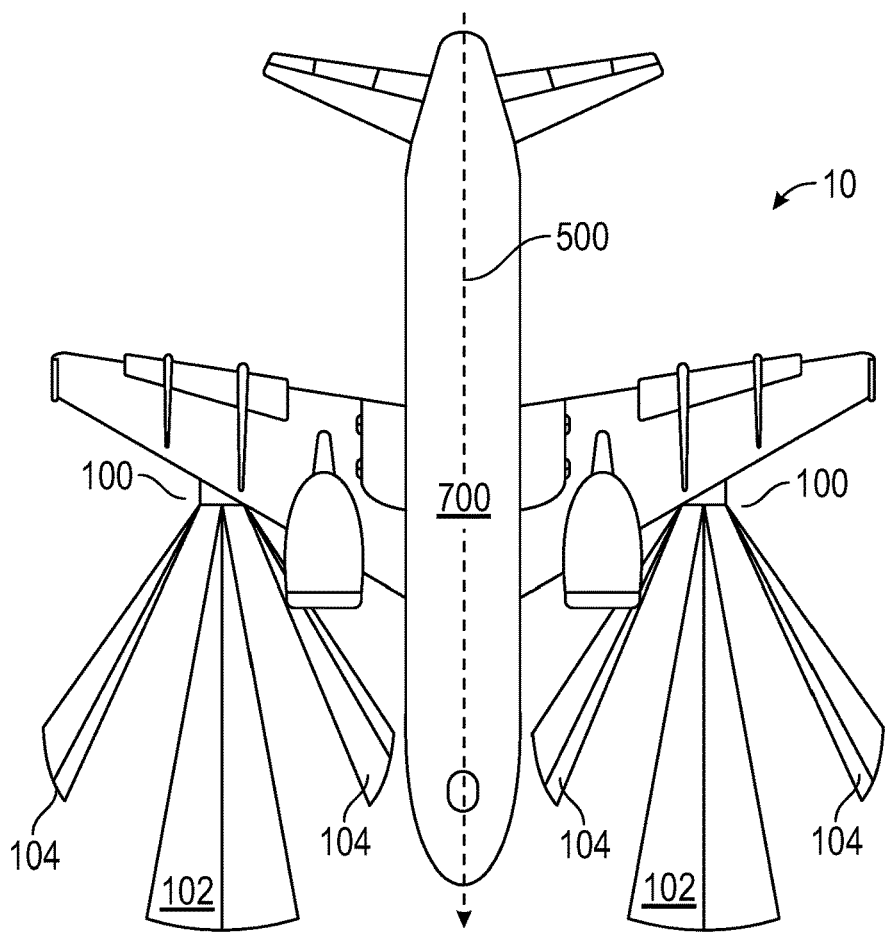

FIG. 5 is a bottom plan view of the fixture installed upon the exterior of an aircraft with all emitters illuminated to demonstrate the collimation of the beams produced.

Figure 6:
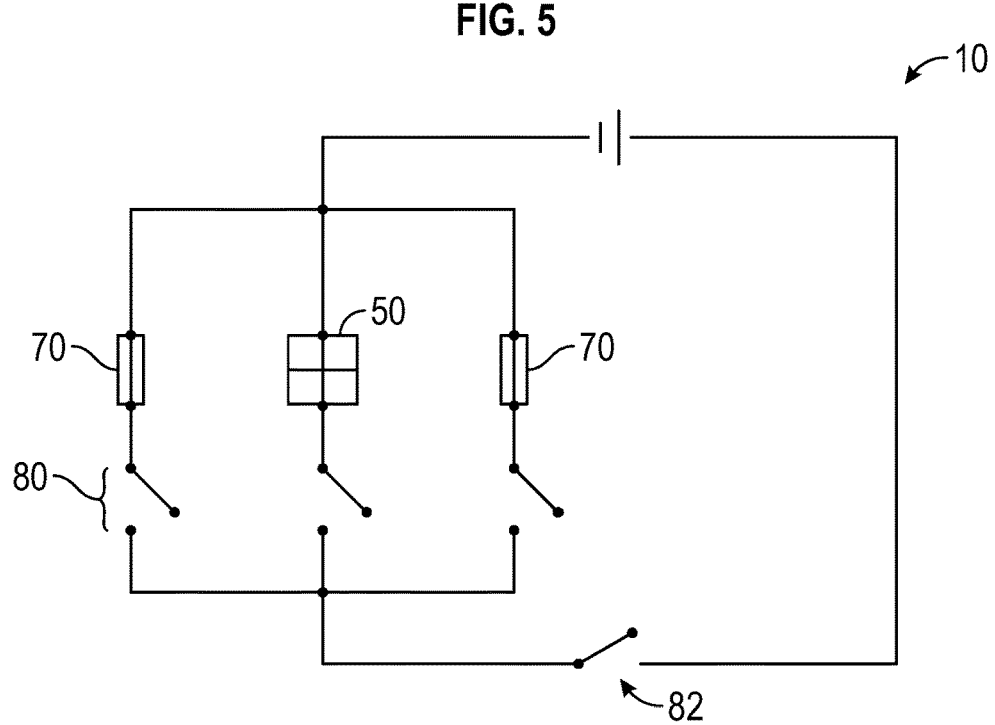

FIG. 6 is a simplified circuit diagram view illustrating the common circuit running each of the emitters.

DETAILED DESCRIPTION OF THE DRAWINGS

The present aircraft exterior multi-emitter array for variable beam profile 10 has been devised to enable independent illumination and control of landing and taxiing lights for an aircraft run on a common circuit and illuminated within a common light fixture 100. Combining dual lighting capabilities within one light fixture 100 requires less space on the exterior of the aircraft fuselage to mount said lights and therefore presents less circuitry rigged for the lighting systems and less drag.

Further, the use of low-energy Light Emitting Diodes ("LEDs") enables illuminance at relatively lower power demands and increases lifespan of the lights. The variable beam profile enabled by the instant multi-emitter array 10 is accomplished by situating at least one central emitter 50 beneath an optic and placing at least one peripheral emitter 70 spaced-apart from the said at least one central emitter 50 such that illuminance from the at least one peripheral emitter 70 is collimated and/or reflected and/or refracted and/or focused (collectively, herein throughout, "directed") into a more lateral aspect relative the aircraft proper (that is, in a coronal plane relative to the aircraft's longitudinal axis for use when taxiing) versus a central beam, directed from the at least one central emitter 50, forwardly relative to the longitudinal axis of the aircraft (for use when landing).

Referring to FIG. 1, an example of the instant multi-emitter array 10 is illustrated with optic 20 removed to show at least one central emitter 50 disposed, in this example embodiment, between two diametrically disposed peripheral emitters 70 in condenser 22. It should be noted that any plurality of peripheral emitters 70 is contemplated as within the scope of this disclosure, in any peripheral arrangement as surrounding or spaced-apart from the at least one central emitter 50. In the example embodiment depicted, each of the emitters 50, 70 shown is contemplated to be an LED. However, other emitters are contemplated as within scope of this invention (including, for example, Organic Light Emitting Diodes ("OLEDS"); compact fluorescents ("CFLs"); halogens; metal halides; and other sources of electrically producible light operable in circuit), the principal inventive step contemplated herein being the relative arrangement of emitters comprising a multi-emitter array, and not a particular source of light.

In this example embodiment, at least one central emitter 50 includes four emitters disposed in adjacent proximity. The number of emitters comprising the at least one central emitter 50 may include such plurality as is adapted to meet FAA standards of luminous intensity along a given steradian at a desired power or in creating a desired hue. Further, including a plurality of emitters ensures multiple points of failure before the at least one central emitter 50 goes dark. Further, some of the emitters comprising the at least one central emitter 50 may be independently operable—that is, when a first central emitter is illuminated a second central emitter may not be illuminated. When the first central emitter is not illuminated, but power is fed to the branch wherein the at least one central emitter is disposed, then the second central emitter is illuminated. In other words, the at least one central emitter 50 may include central emitters capable of illuminating in the alternative when power is fed to the circuit and at least one of the central emitters fails. Additionally some emitters may be operable to create a desired luminous intensity or particular hue, say, intermittently or consistently.

In this example embodiment depicted, the at least one peripheral emitter 70 includes two clusters of peripheral emitters disposed diametrically apart on either side of the at least one central emitter 50. In this example embodiment, each of the two clusters of emitters includes at least two emitters each, for the same reasons as described above, thereby providing multiple points of failure. Each of these emitters may illuminate together, to create a desired intensity or range of hues, or in the alternative as set forth regarding the at the at least one central emitter above. It should be noted, of course, that additional emitters may be included in each cluster of the peripheral emitters, the intent being to provide an array of emitters whence luminance is directable along desired steradians in creating the variable beam profile the said light fixtures are herein devised to produce.

FIG. 2 illustrates an example embodiment of fixture 100 wherein the at least one peripheral emitter 70 is disposed as a plurality of emitters circumferentially disposed surrounding the at least one central emitter 50. Alternative embodiments are contemplated as within scope of this disclosure, including for example peripheral emitters disposed at repeating segments around the at least one central emitter, as for example, at 90° increments, 120° increments, 45° increments, 72° increments, and so on. Additionally, the shape shown herein is circular, however the distribution of the at least one peripheral emitter is contemplated to occupy any shape wherein the said at least one peripheral emitter 70 is able to illuminate along a directed beam in contrast to the directed beam illuminated by the at least one central emitter 50, whereby the at least one peripheral emitter 70 is suited for use when taxiing and the at least one central emitter 50 is suited for use when landing.

FIG. 3 is a side elevation view of an example embodiment of an idealized, simplified form of the instant multi-emitter array 10, taken in cross-section along the line 3-3 of FIG. 1.

FIG. 3 shows a simplified view of an example embodiment of the various beam profiles the instant light fixture 100 enables. In this simplified rendering, luminance emitted from the at least one central emitter 50 is directed into beam 102 directed forward in a capacity suited for landing. Conversely, luminance emitted from the at least one peripheral emitter 70 is directed into beam 104 separate from and distinct beam 102 directed from the at least one central emitter 50. Optic 20 and condenser 22 are adapted to direct the various beams according to steradians appropriate for use during landing (in the case of the at least one central emitter 50) and taxiing (in the case of the at least one peripheral emitter 70). It should be noted that the optic 20 and condenser 22 may be devised to enable multiple beam profiles adapted to the number and placement of the at least one peripheral emitter 70 in relation to the at least one central emitter 50. Nonetheless, luminance is directed along such steradians as meet the FAA standards required for landing and taxiing lights.

FIG. 4 is a transverse view of an example embodiment of fixture 100 illustrating idealized collimators associated with each emitter. In this idealized figure, emitters 70A, 70B, and 50 are disposed in condenser 22 in association with corresponding collimators A, B, and C respectively. Each of the said collimators A, B, and C is devised to direct light emitted by the associated emitter 70A, 70B, and 50, into equivalent beams 104 and 102 shown in FIG. 3. The term collimator is used herein to mean any physical structure by which emittance is directable (focused, reflected, refracted, collimated, and/or directed) into a desired beam profile, and may consist entirely of surfaces and sections of optic 20 and or condenser 22. Each collimator, however, may include additional structures not shown that enable the direction of light to produce beams 102 and 104, and may include use of lenses, reflectors, refractors, or other physical structures enabling translucence and/or the direction and collimation of light into distinct beams. In an example embodiment contemplated herein and shown, each collimator A, B, and C, is producible by condenser 22 surface surrounding each associated emitter reflecting light generally toward an associated section of optic 20, which then focuses the incident rays upon said associated section into an associated beam (see also FIG. 3).

FIG. 5 is a bottom plan view of an example embodiment of the multi-emitter array fixture 100 in-use on the exterior of an aircraft 700. Fixtures 100 are overrepresented in this stylized diagram for purposes of illustration only. Axis 500 represents the longitudinal axis of the aircraft, from nose to tail. Beams are illustrated by way of example only, to show the directed landing light beam 102 relative to the taxiing beams 104.

FIG. 6 illustrates an example embodiment of a simplified circuit illustrating a to possible means of connecting the various emitters 50, 70 in parallel to be independently operable while run in the same circuit. Independent switches 80 enable such independent operation. Master switch 82 may enable powering to circuit as a whole. It should be noted that additional branch circuits may be included to enable illuminating emitters in the alternative, such as when failure of one emitter causes illumination of an alternative emitter disposed in similar situation within the fixture.

What is claimed is:

1. An aircraft exterior lighting multi-LED array enabling variable beam profiles for both landing and taxi lights upon an aircraft, said exterior lighting multi-LED array comprising:
    a fixture;
    at least one central emitter disposed centrally in the fixture under at least a first collimator; and
    at least one peripheral emitter disposed off-center in the fixture under at least a second collimator;
    wherein a single circuit controls switching between landing lighting and taxi lighting on the aircraft exterior by activating and deactivating the at least one peripheral emitter in lieu of, and in addition to, the at least one central emitter.

2. The multi-LED array of claim 1 wherein the at least one peripheral emitter includes a plurality of emitters diametrically situated on either side of the at least one central emitter.

3. The multi-LED array of claim 1 wherein the at least one peripheral emitter includes a plurality of emitters radially disposed circumferentially around the at least one central emitter.

4. The multi-LED of claim 1 wherein the collimator associated with the at least one central emitter is a lens integral with the collimator associated with the at least one peripheral emitter.

5. The multi-LED of claim 1 wherein the collimator associated with the at least one central emitter and the collimator associated with the at least one peripheral emitter are separate lenses.

6. An aircraft exterior lighting multi-LED array enabling variable beam profiles for both landing and taxi lights upon an aircraft, said exterior lighting multi-LED array comprising:
    a fixture;
    at least one condenser interior to the fixture;
    at least one central cluster of emitters disposed within the condenser and centrally in the housing under at least a first collimator; and
    at least one peripheral cluster of emitters disposed within the condenser off-center in the fixture and under at least a second collimator;
    wherein a single circuit controls switching between landing lighting and taxi lighting on the aircraft exterior by activating and deactivating the at least one cluster of peripheral emitters in lieu of, and in addition to, the at least one cluster of central emitters.

7. The multi-LED array of claim 6 wherein the at least one peripheral cluster of emitters includes a plurality of clusters diametrically situated on either side of the at least one central cluster of emitters.

8. The multi-LED array of claim 6 wherein the at least one peripheral cluster of emitter includes a plurality of emitters radially disposed circumferentially around the at least one central cluster of emitters.

9. The multi-LED of claim 6 wherein the collimator associated with the at least one central cluster of emitters is a lens integral with the collimator associated with the at least one peripheral cluster of emitters.

10. The multi-LED of claim 6 wherein the collimator associated with the at least one central cluster of emitters and the collimator associated with the at least one peripheral cluster of emitters are separate lenses.

* * * * *